United States Patent [19]

Nakamura et al.

[11] 3,978,498

[45] Aug. 31, 1976

[54] EXPOSURE TIME CONTROL CIRCUIT OF SHUTTER OF A CAMERA

[75] Inventors: Yukio Nakamura, Yotsukaido; Shogo Kato, Taiei; Shinji Nagaoka, Yotsukaido, all of Japan

[73] Assignee: Seiko Koki Kabushiki Kaisha, Japan

[22] Filed: Feb. 5, 1975

[21] Appl. No.: 547,401

[30] Foreign Application Priority Data

Feb. 7, 1974 Japan.......................... 49-15638[U]

[52] U.S. Cl. ................................. 354/51; 354/60 R
[51] Int. Cl.² .......................................... G03B 7/08
[58] Field of Search...................... 354/50, 51, 60 R

[56] References Cited
UNITED STATES PATENTS

| | | | |
|---|---|---|---|
| 3,693,518 | 9/1972 | Yamada et al........................ | 354/31 |
| 3,712,192 | 1/1973 | Ono et al............................. | 354/51 |

*Primary Examiner*—L. T. Hix
*Assistant Examiner*—James LaBarre
*Attorney, Agent, or Firm*—Robert E. Burns; Emmanuel J. Lobato; Bruce L. Adams

[57] ABSTRACT

An exposure time control circuit for an electric shutter of a camera includes a monolithic IC having input circuitry in the form of a transistorized differential amplifier having two input terminals. A time-constant circuit develops a timing signal proportional to the brightness of the object field and applies it to one input terminal and a reference voltage signal is applied to the other input terminal to control the exposure timing. In order to enable varying the reference voltage through a wide range so that the input terminals can also be used for introducing other exposure information variables, such as input signals representative of the F-value, film sensitivity, etc., a transistor is connected between the IC and the source of electric power.

3 Claims, 1 Drawing Figure

EXPOSURE TIME CONTROL CIRCUIT OF SHUTTER OF A CAMERA

BACKGROUND OF THE INVENTION:

The present invention relates to an exposure time control circuit of a camera for automatically controlling the exposure time in dependence upon the brightness of the object field and, in addition thereto, for automatically controlling other exposure variables.

Camera control circuits utilizing a monolithic IC having a parabolic characteristic are known in the art. In general, the IC includes signal input circuitry in the form of a transistorized differential amplifier and therefore the IC possesses very good voltage and temperature characteristics. To one input terminal of the IC is applied a timing signal for controlling the exposure time and to another input terminal is applied a standard or reference voltage signal, both signals being fed to the differential amplifier to effect control of the exposure timing.

The drawback of this type control circuit is that due to the base-emitter voltage characteristic of the transistors which constitute the differential amplifier, it is not possible to vary the level of the reference voltage except within a very narrow range. This prevents use of these input terminals as inputs for introducing other exposure information variables, such as input signals representative of the F-value, film sensitivity, etc., whose reference voltage level must be capable of varying over a wide range. Moreover, in case of connecting the polarity of the electric source battery reversely, there is a risk of damaging the IC by excessive current flow owing to the use of the monolithic IC.

The exposure time control circuit of the invention enables various exposure information variables, in addition to that representative of the brightness of the object field, to be applied as inputs to the IC. In addition, the control circuit of the invention prevents break-down of the IC due to reverse connection of the electric source battery.

Figure 1:
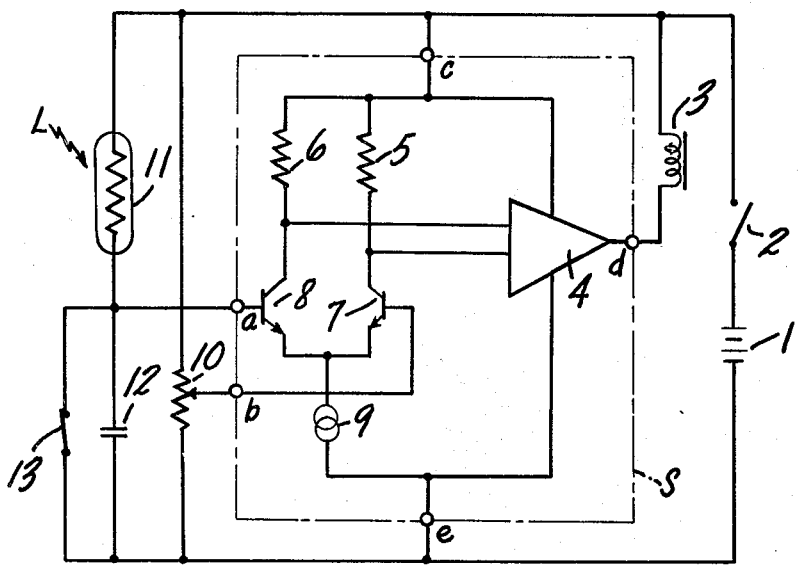
FIG. 1 is a circuit diagram showing one type of prior art exposure time control circuitry for a camera.

DETAILED DESCRIPTION OF INVENTION:

Before describing the invention, a description will first be given of typical prior art circuits. One type of known exposure time control circuit which is constructed partly in the form of an integrated circuit, or IC, is shown in FIG. 1. The circuit comprises an electric source battery 1, an electric source switch 2, electromagnet 3 for effecting shutter control, an amplifying circuit 4, 5, 6, 7, a differential amplifier formed of transistors 7, 8, a constant current source 9, and a variable resistor 10 for producing a standard voltage which is fed to an input terminal b, all of which are interconnected as shown in FIG. 1A photoelectric element 11 is connected to receive and sense the brightness from an object being photographed and coacts with a condenser 12 for forming a time-constant circuit. A timing switch 13 is connected in parallel with the condenser 12 and is connected to open in relation to the opening action of the shutter. The inside of a chain line S constitutes a monolithic IC having a 1st input terminal a to which the output of the time-constant circuit is connected, a 2nd input terminal b to which the standard voltage is applied, power terminals c and e connected respectively to the positive and negative sides of a source of potential, and an output terminal d.

Next, the operation of the FIG. 1 circuit will be described. By pushing down the release button of the camera, the electric source switch 2 is turned ON and a current flows in the coil of the electromagnet 3. This initiates the opening action of the shutter followed by the opening of the timing switch 13. In the time-constant circuit, the value of resistance of the photoelectric element 11 and the value of capacitance of the condenser 12 determine the voltage applied to the 1st input terminal a, and when the voltage applied to the condenser exceeds the level of the 2nd input terminal b set by the variable resistor 10, a signal from the differential amplifier interrupts the supply of current to the electromagnet 3 by the amplifier 4 thereby enabling closing of the shutter.

In this case, the variable resistor 10 can be used for introducing exposure information factors other than the brightness of the object field. For instance, if the voltage level of the 2nd input terminal b is set to correspond to the iris value (F value) of the lens, the exposure time will be controlled in accordance with the iris value.

However, the 2nd input terminal voltage level, that is, the standard voltage level, was of use in a narrow range so that it has not heretofore been practical to use the 2nd input terminal for purposes of introducing other exposure variables. This was due to the base-emitter voltage VBE of the transistor 8 that constitutes the differential amplifier, and in case the standard voltage is selected at a low value, the voltage VBE cannot be considered to be negligible so that it has been necessary to select a comparatively large value for the lower limit of the standard voltage level.

Figure 2:
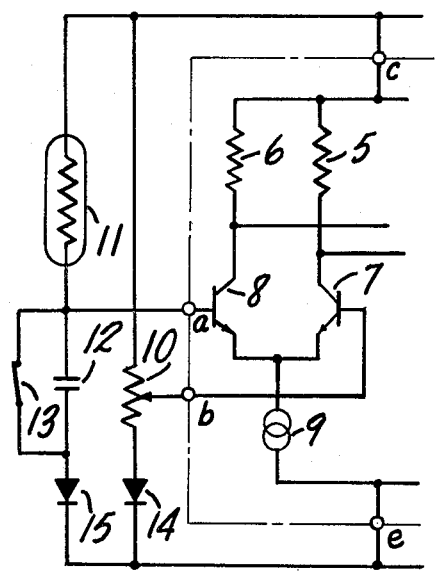
FIG. 2 is a circuit diagram showing another prior art exposure time control circuitry.

As a method of eliminating this demerit, the circuitry of FIG. 2 has been devised and in which the same numbers as in FIG. 1 are used to indicated the same or similar parts. In this circuit, a diode 14 is connected between the condenser 12 and the negative side of battery 1 and a diode 15 is connected between the variable resistor 10 and the negative side of the battery. As mentioned above, the voltage VBE of transistors 7, 8 made the selection range of the standard voltage level rather narrow, and this has been compensated for in the FIG. 2 circuit by using the diodes 14, 15. Therefore, a sufficient selection range could be obtained by means of the variable resistor 10 for choosing the standard voltage to be applied to the 2nd input terminal b so as to enable introduction of other exposure variables, such as the iris value of the lens, the sensitivity of film, etc.

The exposure time control circuitry of the invention will now be described with reference to FIG. 3 and in which the same numbers as in FIG. 1 are used to indicate the same or similar parts. In accordance with the invention, a semiconductor switch in the form of a transistor 16 is connected with its collector-emitter path interposed between the source terminal e and the negative side of the battery 1. The base of the transistor 16 is connected thru a resistor 17 to the positive side of the battery 1.

Figure 3:
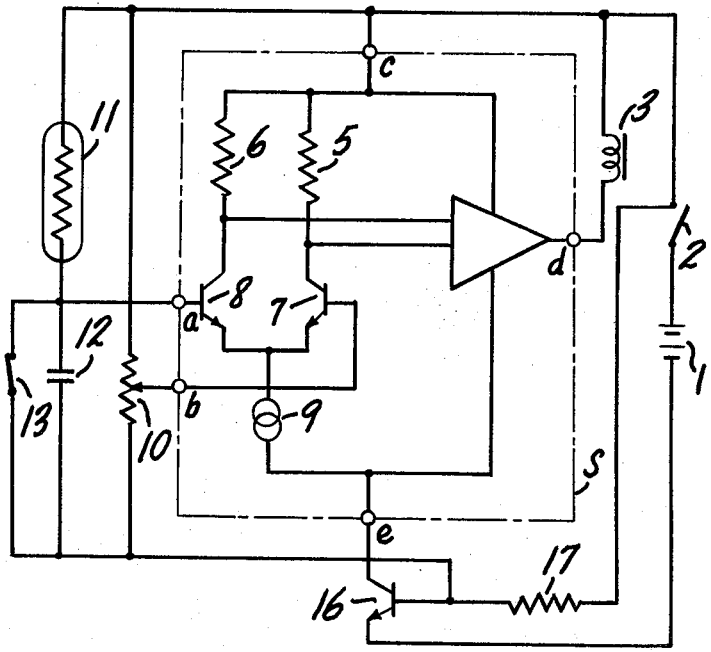
FIG. 3 is a circuit diagram of one embodiment of exposure time control circuitry according to the invention.

The operation of the FIG. 3 circuit is basically similar to that of the prior art circuit in FIG. 1, namely, the voltage level of the 2nd input terminal b of the differential amplifier is set corresponding to the desired exposure factor and the output voltage from the time-constant circuit corresponding to the brightness of the object is appied to the 1st input terminal a, and when these two levels are coincident, a closing signal is sent to the electromagnet 3 to effect closing of the shutter.

The transistor 16 becomes conductive when the electric source switch 2 is closed as its base is connected to the positive side of the battery 1 through the resistor 17. On the other hand, in case the electric source battery 1 is reversely connected in the circuit, the transistor 16 becomes nonconductive, thereby preventing the IC from flowing excess current.

By connecting the condenser 12 for determining the exposure time-constant and the variable resistor 10 between the 1st and the 2nd input terminals of the differential amplifier, on the one hand, and to the base of the transistor 16, on the other hand, a similar effect as mentioned in the description of FIG. 2 is obtained, that is, the voltage VBE of the transistors 7, 8 are effectively compensated so that a wide range of voltage levels can be applied as the standard voltage level to the input terminal a. This enables the introduction of a wide range exposure information factors other than that pertaining to the brigntness of the object field.

As described above, the exposure time control circuit of the invention incorporates a monolithic IC and enables the selection range of the standard voltage level to be extended at low cost merely by the addition of a transistor-resistor network. Furthermore, the transistor-resistor network functions to protect the IC in event the electric source battery is incorrectly connected to the circuitry with its battery polarities reversed.

What we claim is:

1. An exposure time control circuit for a shutter of a camera comprising: an integrated circuit block connectable during use of the circuit to a power source and including, as an input stage, a differential amplifier having first and second input terminals; a transistor having a collector connected to said integrated circuit block and an emitter connectable to one side of the power source; a resistor connected to the base of said transistor and connectable to the other side of the power source; a time-constant circuit including a capacitor connected between the base of said transistor and said first input terminal of said differential amplifier; and a variable resistor connected between the base of said transistor and said second input terminal of said differential amplifier and operable to selectively vary the voltage level of said second input terminal by selective variation of its resistance thereby enabling a wide range of voltage levels to be applied to said second input terminal so that a plurality of different input signals representative of different exposure factors can be applied to said second input terminal.

2. In an exposure time control circuit of a camera of the type having an integrated circuit including, as an input stage, a transistorized differential amplifier having first and second input terminals which comprise terminals of said integrated circuit, a pair of power terminals connectable during use of the exposure time control circuit to an electric power source, and an output terminal; a time-constant circuit connectable to the electric power source and operable to develop a timing signal representative of the brightness of the object field being photographed and apply the same as an input signal to said first input terminal; and a variable resistor connected in parallel with said time-constant circuit and being selectively variable so as to apply a voltage level within a range of voltage levels as an input signal to said second input terminal: means to compensate for the base-emitter voltages of the transistors constituting said transistorized differential amplifier to thereby enlarge the range of voltage levels which can be applied to said second input terminal to enable other input signals representative of exposure variables other than the brightness of the object field to be applied to said second input terminal, said means comprising a transistor having its base connected to the junction point of said variable resistor and said time-constant circuit and having its collector-emitter path connected to one of said pair of power terminals.

3. An exposure time control circuit according to claim 2; including a power source switch connected to the base of said transistor and effective to enable power to be applied thereto whereby said transistor prevents power from being applied to said integrated circuit in the event the electric power source is incorrectly connected in reverse polarity.

* * * * *